UNITED STATES PATENT OFFICE.

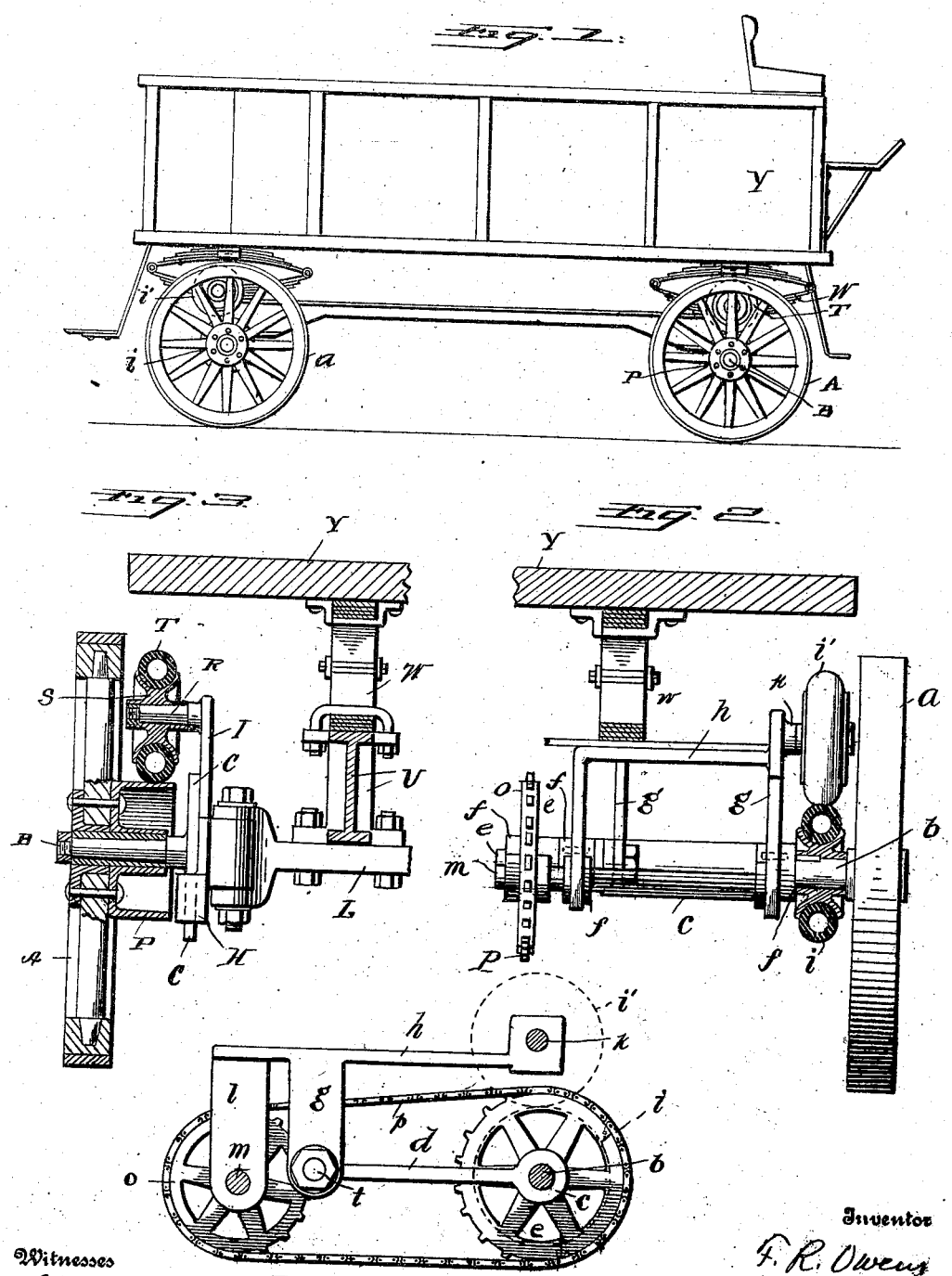

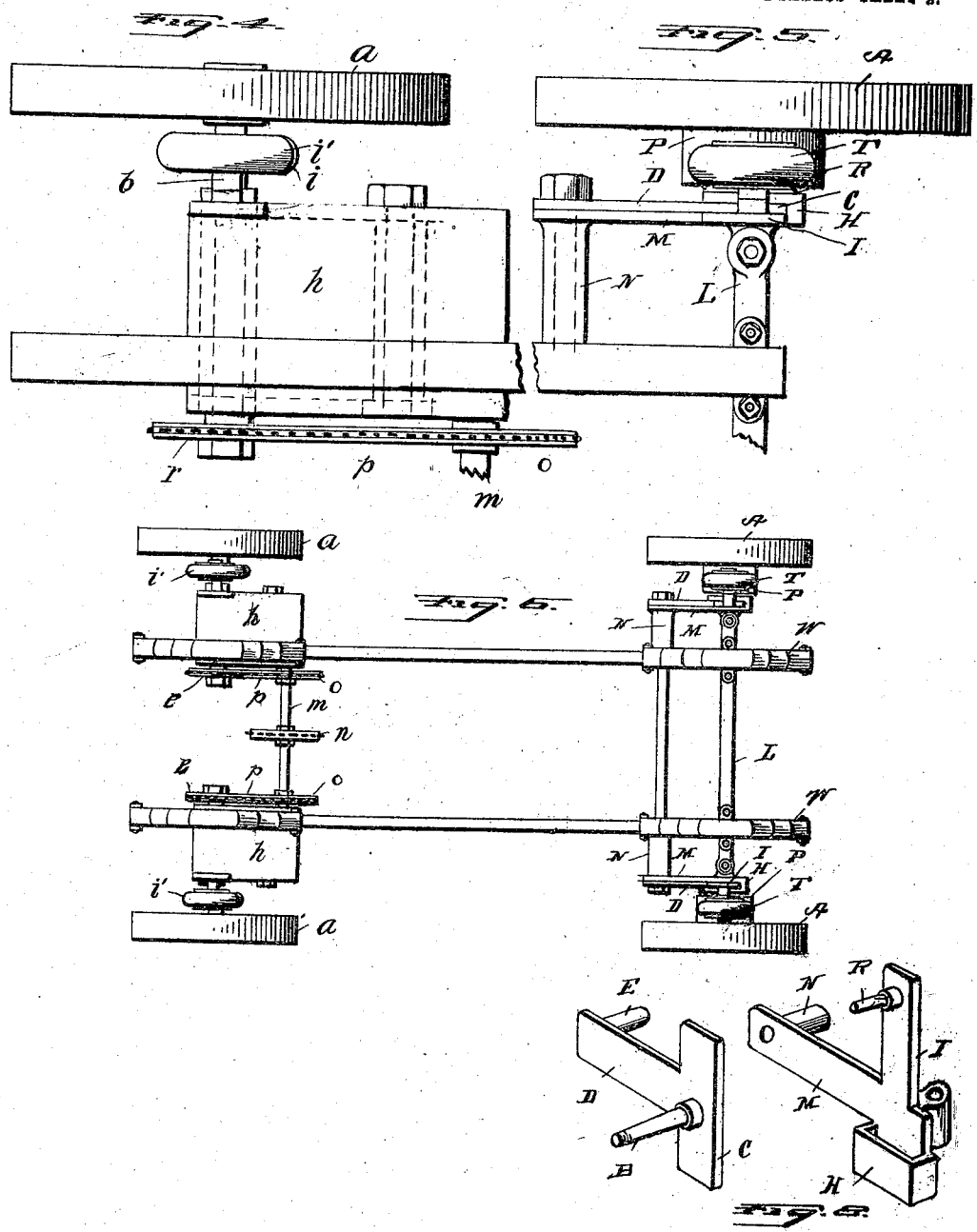

FRANK RODERICK OWENS, OF BUREAU, ILLINOIS.

RUNNING-GEAR FOR VEHICLES.

No. 858,348.  Specification of Letters Patent.  Patented June 25, 1907.

Application filed October 20, 1905. Serial No. 283,644.

*To all whom it may concern:*

Be it known that I, FRANK RODERICK OWENS, a citizen of the United States, residing at Bureau, in the county of Bureau and State of Illinois, have invented certain new and useful Improvements in Running-Gears for Vehicles, of which the following is a specification, reference being had therein to the accompanying drawing.

This invention relates to running gears for vehicles, and is specially adapted for use in self-propelled vehicles, although applicable to other road vehicles.

The object of the invention is to secure, in great measure, the advantages due to pneumatic or cushioned tires, without the necessity of exposing a soft or permeable substance to the wear of the roadway. And the invention consists in the construction, application, and combination of pneumatic or air containing tubes or cushions to the hubs of vehicles, in manner as will be pointed out and claimed hereinafter.

Figure 1 is a side elevation of so much of a motor wagon as is necessary to show the relation of parts constituting the present invention. Fig. 2 is a vertical section through the hub of one of the hind wheels, as seen from the front, showing some parts connected to the wheel hub in elevation. Fig. 3 is a vertical section through one of the front wheels, showing immediate connections. Fig. 4 is a top plan of one of the rear wheels and connections. Fig. 5 is a similar plan of one front wheel and connections. Fig. 6 is a plan of the running gear complete. Fig. 7 is a broken side elevation and partial section of the casting and link of Fig. 4, with some additional details, and Fig. 8 is a detail perspective of the front wheel brackets.

I will first describe the front wheel connections, assuming that the steering gear is of any usual or suitable character.

A represents the front wheel of the vehicle, which may be of any common kind. A short axle B extends through the wheel hub, and this axle is rigid with a plate C, which plate has an arm D, and a pintle E (see Fig. 8). The upper end of plate C enters a loop H on the face plate I, which plate I is hinged to the cross axle L of the vehicle. The plate or bracket I has an arm M, which is parallel with the arm D of the plate or bracket C, when the parts are assembled, and the pintle E of arm D enters a bearing N of arm M. The fit of the plate C in loop H is loose, so that this pintle C and axle B can rise relatively to the plate I, swinging on the pintle E as a pivot.

The wheel A carries a false hub or drum P, projecting inwardly. The plate I has a rigid axle R, projecting over this drum. A wheel S, provided with a pneumatic or cushioned tire T, is carried on the axle R, over the drum P, so that the elastic rim of this wheel is in contact with drum P.

The axle L supports the body Y of the vehicle, as by means of bolster U and spring W, or by other usual means.

Now supposing the vehicle to be in motion, and the wheel A to run over a stone. The wheel A of course rises, raising hub P and axle B. Axle B being rigid with plate C lifts said plate in the loop H, all swinging on the pintle E. The hub P compresses tire T on wheel S, and to the extent of the elasticity of this tire T the axle R need not be lifted, but if it does lift it will raise the main axle L, and the further action of the mechanism is that usual to spring vehicles. The wheel S will rotate with the rotation of drum P.

By this construction most of the advantages of pneumatic tires are secured, with vastly less first cost, and with very little wear on the elastic tires.

I will now describe the rear wheel connections.

Let *a* represent the rear wheel and *b* the axle. This axle *b* passes through a bearing *c*, in a link *d*. The axle *b* has a driving sprocket wheel *e* thereon, and is held in its bearing in link *d* by suitable collars, as *f*. The link *d* is pivoted in hangers *g*, pendent from a casting *h*, in the construction shown in Figs. 2, 4, 6, 7.

On the axle *b* there is a pneumatic or cushion wheel *i* which practically becomes the wheel hub, and over the said wheel, on a pintle *k* projecting from casting *h*, there is a similar wheel *i'*. The relative position of these two wheels is indicated in dotted circles, Fig. 7.

In front of the pivot of link *d*, there is a hanger *l* in which the driving shaft *m* is journaled. (Of course the two sides of the vehicle correspond.) Shaft *m* is provided with a driving sprocket *n*, and also sprockets *o*, *o*, which are connected by sprocket chains *p*, *p*, (Fig. 6) with driving sprockets *e* on shafts *b*. The rear wheels will be driven by the sprocket chains from the shaft *m*, the chains permitting the slight movement of wheel $i$ as the rear wheel rises or falls in passing an obstacle.

Springs $w$ are suitably supported from castings $h$, and in turn support body Y.

The rear end of the link $d$ will be free to rise and fall, swinging on its pivot $t$. The wheels A, A, $a$, $a$, support the body of the carriage, and the load, but mediately, through the pneumatic tired wheels S at the front of the vehicle, and through wheels $i$, $i'$ at the rear of the carriage.

The driving mechanism is subject to many modifications as will be readily understood.

I have not attempted to describe exact constructions, as a skilled mechanic will readily adapt the mechanism above described to the circumstances of the particular vehicle to which this running gear is applied. A brake or brakes may be applied as convenience dictates.

I claim:

1. In a vehicle, a short axle and one of the vehicle wheels thereon, a plate arranged vertically and rigid with said short axle, a pintle on said plate, a face plate pivoted to said pintle and hinged to the body support of the vehicle, a rigid axle on this plate, and a cushion tired wheel on said second axle with its periphery bearing on the hub of said vehicle wheel, all combined.

2. In a vehicle, the combination of two plates hinged together near their ends and each having a rigid short axle, said axles being parallel, a vehicle wheel on one of said short axles, a cushion tired wheel on the other axle and with its tire on the hub of said vehicle wheel, and the wagon body connected to the plate on which the cushion-tired wheel is supported.

3. In a vehicle, the combination of two plates each having a projecting short axle, said plates held side by side so as to permit independent vertical movement of said short axles, a vehicle wheel on one of the axles and a cushion tired wheel on the other axle with its tire resting on the hub of the wheel, and the vehicle body yieldingly connected to the plate on which the cushion tired wheel is supported.

4. The combination with a vehicle wheel provided with a drum hub, of a cushion tired wheel with its tire resting on said drum, the axle of said cushion tired wheel being independently supported to move in an arc above the drum, and the vehicle body connected to axle of the cushion tired wheel.

In testimony whereof I affix my signature in presence of two witnesses.

FRANK RODERICK OWENS.

Witnesses:
PAUL JENSEN,
SCOTT CRAIN.